United States Patent [19]

Barajas et al.

[11] Patent Number: 5,506,967

[45] Date of Patent: Apr. 9, 1996

[54] STORAGE QUEUE WITH ADJUSTABLE LEVEL THRESHOLDS FOR CACHE INVALIDATION SYSTEMS IN CACHE ORIENTED COMPUTER ARCHITECTURES

[75] Inventors: Saul Barajas, Mission Viejo; David M. Kalish, Laguna Niguel; Bruce E. Whittaker, Mission Viejo, all of Calif.

[73] Assignee: Unisys Corporation, Blue Bell, Pa.

[21] Appl. No.: 78,361

[22] Filed: Jun. 15, 1993

[51] Int. Cl.⁶ .................................................. G06F 13/00
[52] U.S. Cl. .................. 395/250; 395/440; 364/DIG. 1; 364/DIG. II
[58] Field of Search .................................. 395/250, 425, 395/400; 364/243.41, 244.3

[56] References Cited

U.S. PATENT DOCUMENTS

| | | | |
|---|---|---|---|
| 4,195,340 | 3/1980 | Joyce | 395/425 |
| 4,663,706 | 5/1987 | Allen et al. | 395/200 |
| 4,829,475 | 5/1989 | Ward et al. | 365/78 |
| 4,864,543 | 9/1989 | Ward et al. | 365/221 |
| 5,025,365 | 6/1991 | Mathur et al. | 364/243.4 |
| 5,058,006 | 10/1991 | Durdan et al. | 364/228.1 |
| 5,084,841 | 6/1992 | Williams et al. | 365/189.07 |
| 5,113,418 | 5/1992 | Szezepanek et al. | 375/118 |
| 5,157,774 | 10/1992 | Culley | 395/425 |
| 5,193,163 | 3/1993 | Sanders et al. | 395/425 |
| 5,218,670 | 6/1993 | Sodek, Jr. et al. | 395/115 |
| 5,265,233 | 11/1993 | Frailons et al. | 395/425 |
| 5,317,720 | 5/1994 | Stamm et al. | 395/425 |

*Primary Examiner*—Parshotam S. Lall
*Assistant Examiner*—Zarni Maung
*Attorney, Agent, or Firm*—Alfred W. Kozak; Mark T. Starr; Robert R. Axenfeld

[57] ABSTRACT

In a time-shared bus computer system with processors having cache memories, an adjustable invalidation queue for use in the cache memories. The invalidation queue has adjustable upper and lower limit positions that define when the queue is logically full and logically empty, respectively. The queue is flushed down to the lower limit when the contents of the queue attain the upper limit. During the queue flushing operation, WRITE requests on the bus are RETRYed. The computer maintenance system sets the upper and lower limits at system initialization time to optimize system performance under maximum bus traffic conditions.

10 Claims, 4 Drawing Sheets

STORAGE QUEUE WITH ADJUSTABLE LEVEL THRESHOLDS FOR CACHE INVALIDATION SYSTEMS IN CACHE ORIENTED COMPUTER ARCHITECTURES

BACKGROUND OF THE INVENTION

1. Field of the Invention

The invention relates to buffer queue structures particularly with respect to utilization in the cache invalidation logic of a cache oriented computer architecture.

2. Description of the Prior Art

Present day digital computer architectures often include interconnected subsystems comprising a plurality of central processor modules, a main memory subsystem and one or more Input/Output (I/O) subsystems. The central processor modules, main memory and I/O subsystems preferably intercommunicate by a time-shared bus system intercoupling the component sections of the computer system. In this architecture, each central processor module may include a private cache into which the processor copies words from main memory utilizing the cache in performing its processes. For example, a processor may copy program instructions and data from main memory to its cache and, thereafter, execute the program task from cache. As is appreciated, cache is used in this manner to enhance performance. The cache memory is significantly faster than main memory and the processor with the cache avoids going back and forth on the bus to main memory for each instruction.

A problem recognized in such systems is that of cache consistency. The data in the cache memories and main memory must be maintained coherent and updated with respect to each other. All copies of information at a specific address in all of the memory facilities must be maintained identical. For example, if a first one of the processors executes a WRITE TO MEMORY overwriting a main memory location that had been copied by a second one of the processors into its cache, the data in that location of the cache of the second processor becomes obsolete and invalid. The cache inconsistency condition is exacerbated when, for example, an I/O subsystem streams data into main memory overwriting numerous memory locations cached by the processors.

Traditionally, computer systems with cache memories maintain data integrity by using a cache invalidation process. The process involves each cache system monitoring, or spying upon, the memory operations of the other processors and subsystems in the computer. This is conveniently accomplished by monitoring the memory write operations on the bus. When a memory write operation is detected, each cache memory system must, at some time, execute an internal cache invalidation operation or cycle. The cache invalidation cycle involves testing the contents of the cache for the specific address of the write operation that was detected. If the cache memory system determines that it contains this address, the system marks the address as invalid. The processor with the cache must update the contents of an invalid cache location before using it.

The execution time of a cache invalidation cycle occupies a significant number of bus cycles. Thus, while the invalidation process is executing, the associated processor is prevented from performing program tasks since its cache memory resources, such as the cache tag RAM accessing and invalidation resources, are busy with the invalidation process. Additionally, when the cache memory resources of a processor are occupied with a cache invalidation cycle, other processors may perform WRITES TO MEMORY that will not be detected by the busy cache system. Such an occurrence is catastrophic to the computer system since data coherency is destroyed.

In a prior computer design, when a cache invalidation cycle is in progress, the cache system puts a RETRY signal on the bus in response to a write request from another processor or subsystem, advising the other processor or subsystem to retry its memory write request at a later time. Under conditions of heavy bus traffic, the RETRY mechanism approach may prevent processors from achieving adequate bus access thereby preventing the useful work thereof. A processor may be excessively RETRYed degrading its performance. By excessively RETRYing the I/O subsystem, this approach may also seriously interfere with the I/O subsystem bus traffic thereby detrimentally impeding the entry of data into the computer system. The condition is particularly severe in an I/O subsystem burst mode where data is streamed into main memory.

Other problems of such systems and solutions thereof are described in co-pending U.S. patent application Ser. No. 08/003,352; filed Jan. 12, 1993; entitled "Inhibit Write Apparatus And Method For Preventing Bus Lockout"; and U.S. patent application Ser. No. 08/016,588; filed Jan. 11, 1993; entitled "Varying Wait Interval Retry Apparatus And Method For Preventing Bus Lockout"; both applications by T. C. White et al. and assigned to the Assignee of the present invention. Said Ser. Nos. 08/003,352 and 08/016,588 are incorporated herein by reference.

Systems of the type described may also include an invalidation buffer or queue associated with each cache system for buffering the information detected by the spying system required for specific invalidations. The invalidation process control system may then execute the process at the least inconvenient time for the associated processor. When the invalidation queue becomes full, the RETRY signal may be issued to the bus in response to attempted WRITES with the concomitant disadvantages discussed above.

The invalidation queue should be deep enough to hold sufficient writes to minimize the effect of the cache invalidation cycles on the processor performance while providing that no WRITES are lost. The queue will fill up too quickly if the depth thereof is too shallow whereby insufficient writes are held. When the queue becomes full, the invalidation process executions are mandatory and the work of the associated processor must terminate until the invalidation processing is completed and the queue is no longer full. This is denoted as a queue flushing process. Additionally, when the queue becomes full, there is an increased possibility of losing a write on the system bus. Such a situation is catastrophic to the computer system since data coherency is destroyed.

As discussed above, another consequence of the queue being full is that whenever a new write operation is detected on the system bus, it is RETRYed since there is no room in the queue. The source module of the WRITE operation is then forced to repeat the entire operation, at which time the queue may or may not have room for the new invalidation. The RETRY mechanism can significantly impede data flow on the system bus and can be so detrimental that no useful work is performed. Under such conditions, the performance of the I/O system can be seriously degraded having a detrimental effect on the entire computer system because of the impeded I/O bus traffic. The performance of the processor with the full queue is also seriously diminished as discussed above.

Conversely, it is also undesirable to configure the queue too deep since queues are expensive structures in both cost and hardware area. Additionally, the deeper the queue, the more extensive and complicated is the control logic for supporting the queue.

The depth of the queue should be an optimum size for the relative logical speeds of the incoming system bus write operations and the outgoing invalidation processes using the cache tag RAM accessing and invalidation resources. The Application Specific Integrated Circuit Very Large Scale Integration (ASIC VLSI) gate array type technologies are advantageously utilized in constructing a highly efficient invalidation queue structure. The optimum queue depth is preferably empirically determined when actually running the cache in an operating computer system utilizing the system bus or buses under maximum system conditions. However, when this can be accomplished, the ASIC device has already been designed and constructed and cannot readily be modified in any practical, rapid or cost-effective manner and without significant schedule delays. Even if optimum queue depth is achievable, should the queue become full, invalidation WRITES could be lost with the catastrophic effects discussed above. An additional disadvantage of the system described occurs because the system bus is RETRYed during the queue flushing operation. In the time required to flush a deep queue to zero, the bus can be excessively RETRYed with the concomitant disadvantages discussed above.

SUMMARY OF THE INVENTION

The above disadvantages of the prior art are obviated by an invalidation queue structure with adjustable upper and lower level limits. The structure is utilized in a computer system having first and second memory systems where the second memory system is a cache memory for storing data resident in the first memory system. In operation of the computer system, addressable locations of the first memory are overwritten thereby potentially invalidating locations in cache. A spy system monitors when addressable locations of the first memory are overwritten and provides invalidation address signals representative of the overwritten locations. The queue structure stores the invalidation address signals and an invalidation system in the cache memory system withdraws the queued address signals from the queue structure marking locations of the cache memory system invalid in accordance therewith. An upper limit determining means provides a QFULL signal when the number of invalidation address signals in the queue structure reaches an adjustable upper limit and a lower limit determining means provides a QNOTFULL signal when the number of invalidation address signals in the queue structure reaches an adjustable lower limit. The invalidation system flushes the queue structure in response to the QFULL signal and discontinues the flushing operation in response to the QNOTFULL signal. Means are included for setting the adjustable upper and lower limits in accordance with the empirical operation of the computer system to optimize system performance.

The invention also includes setting the upper limit at less than the maximum capacity of the queue so as to receive and store invalidation addresses that would otherwise be lost if the upper limit were set at maximum queue capacity.

The invention further encompasses setting the lower limit sufficiently high to reduce queue flushing time so as to minimize bus RETRY, and to minimize processor waiting times.

The adjustable queue structure also has utility in other environments such as data communication systems.

DESCRIPTION OF THE PREFERRED EMBODIMENTS

Figure 1:
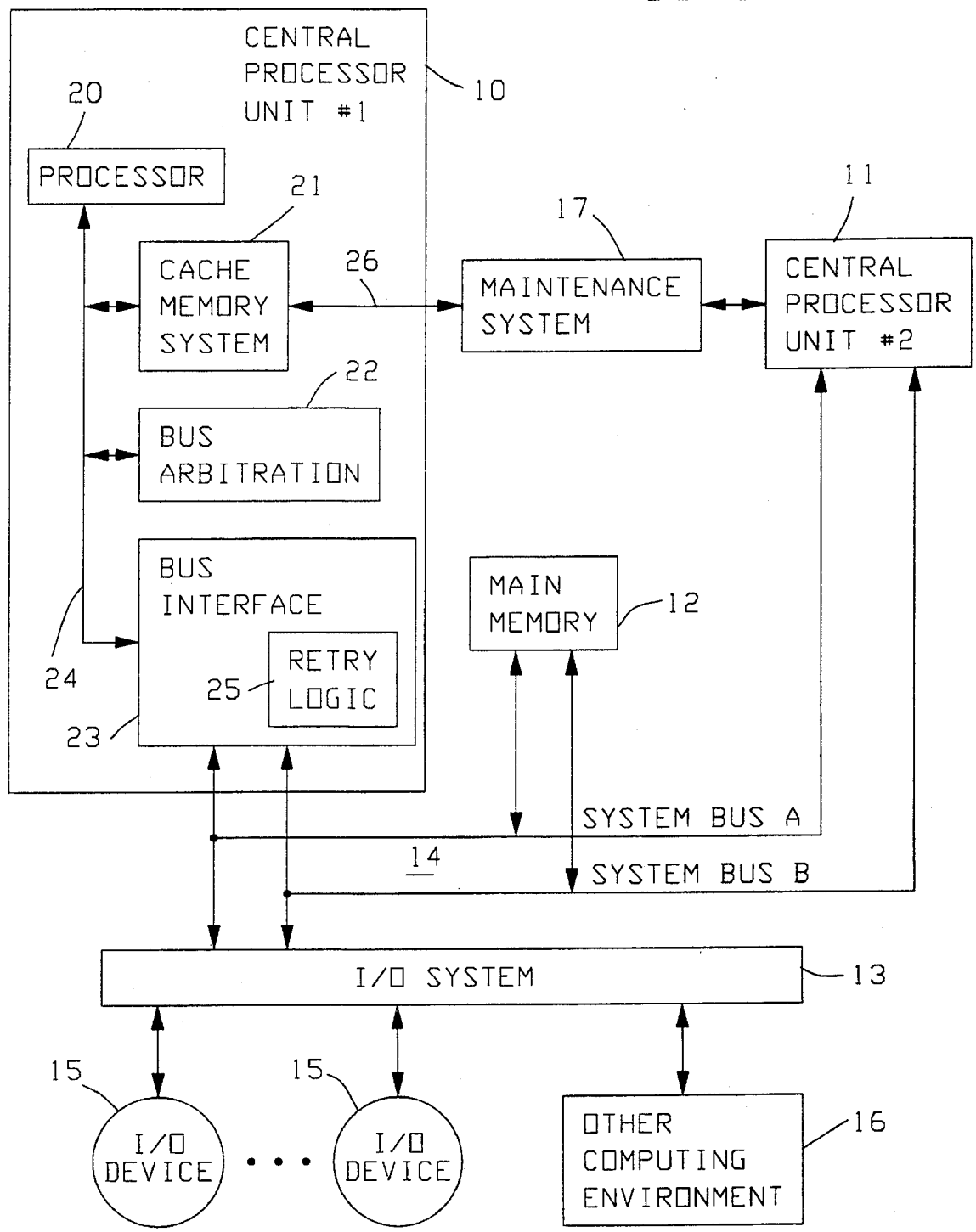
FIG. 1 is a schematic block diagram illustrating a cache oriented, time-shared bus computer architecture in which the present invention can advantageously be utilized.

Referring to FIG. 1, a computer system is illustrated comprising first and second central processor units 10 and 11, a main memory system 12 and an I/O system 13 interconnected by a dual bus system 14. The central processor units 10 and 11 are identical with respect to each other and may, for example, comprise microprocessors for concurrent execution of programs. The main memory system 12 stores the user software instructions and data for the operations to be performed by the computer system. The I/O system 13 couples I/O peripherals 15 into the system which may include disk, tape, printer, and the like. Other cooperative computing environments may couple to the computer system of FIG. 1 through the I/O system 13, as schematically illustrated at 16. The bus system 14 is a conventional time-shared dual bus denoted as system bus A and system bus B, each having data lines to transmit data, request lines for the modules 10, 11 and 13 to acquire the bus and a grant line granting a requesting module access to the bus. The computer system of FIG. 1 also includes a conventional maintenance system 17 illustrated connected to the processing units 10 and 11. The maintenance system 17 performs conventional functions and, in addition, provides parameters used by the present invention.

The central processor unit 10 includes a processor 20, a cache memory system 21, bus arbitration logic 22 and a bus interface 23 interconnected by an internal central processor unit bus 24. The bus interface 23 includes RETRY logic 25 for RETRYing WRITE requests on the bus system 14.

The processor 20 and the corresponding processor in the central processor unit 11 may comprise respective microprocessors for concurrent execution of programs. The cache system 21 includes a fast memory for storing instructions and data read from the main memory 12 by the processor 20, so that the processor 20 can operate thereupon without requiring numerous accesses to the bus system 14 and the main memory 12. As is appreciated, a significant enhancement in performance is achieved by this arrangement. The cache system 21 receives an input from the maintenance system 17 via a bus 26 for reasons to be later described.

The bus arbitration logic 22 together with the corresponding bus arbitration logic in the central processor unit 11, in response to bus requests from the processor 20 and the corresponding processor in the central processor unit 11, controls the bus grants and implements a priority system for resolving bus contention when two or more units simultaneously request access to the bus. The bus arbitration logic 22 and the corresponding logic in the central processor unit 11 preferably utilize a priority assignment protocol that tends to grant equal bus access to all bus requesters. The components 20–22 and 25 of the central processor unit 10 intercommunicate with the main bus system 14 via the bus interface 23. The RETRY logic 25 retries WRITE requests on the bus system 14 in response to a QFULL signal from the cache memory system 21 indicating that the invalidation queue thereof is logically full, in a manner to be later described.

As discussed above, data coherence must be maintained among copies of the same data in the cache memory system 21, the corresponding cache memory system in the central processor unit 11 and in the main memory 12. For example, invalid data in the cache 21 would result if the I/O system 13 would overwrite locations of the main memory 12 from which the processor 20 had cached data in the cache system 21. As discussed above, the cache system 21 includes a spy system for monitoring the system buses 14 for WRITES to the other memories, such as the main memory 12, of the computer system of FIG. 1. The cache system 21 further includes an invalidation system to determine if the detected WRITE addresses are in the cache and to mark these cache locations invalid. The invalidation system of the cache system 21 operates in accordance with the present invention, in a manner to be described, so as to minimize interfering in the performance of the processor 20 and in the operation of the computer system of FIG. 1, particularly with respect to the operation of the I/O system 13.

Figure 2:
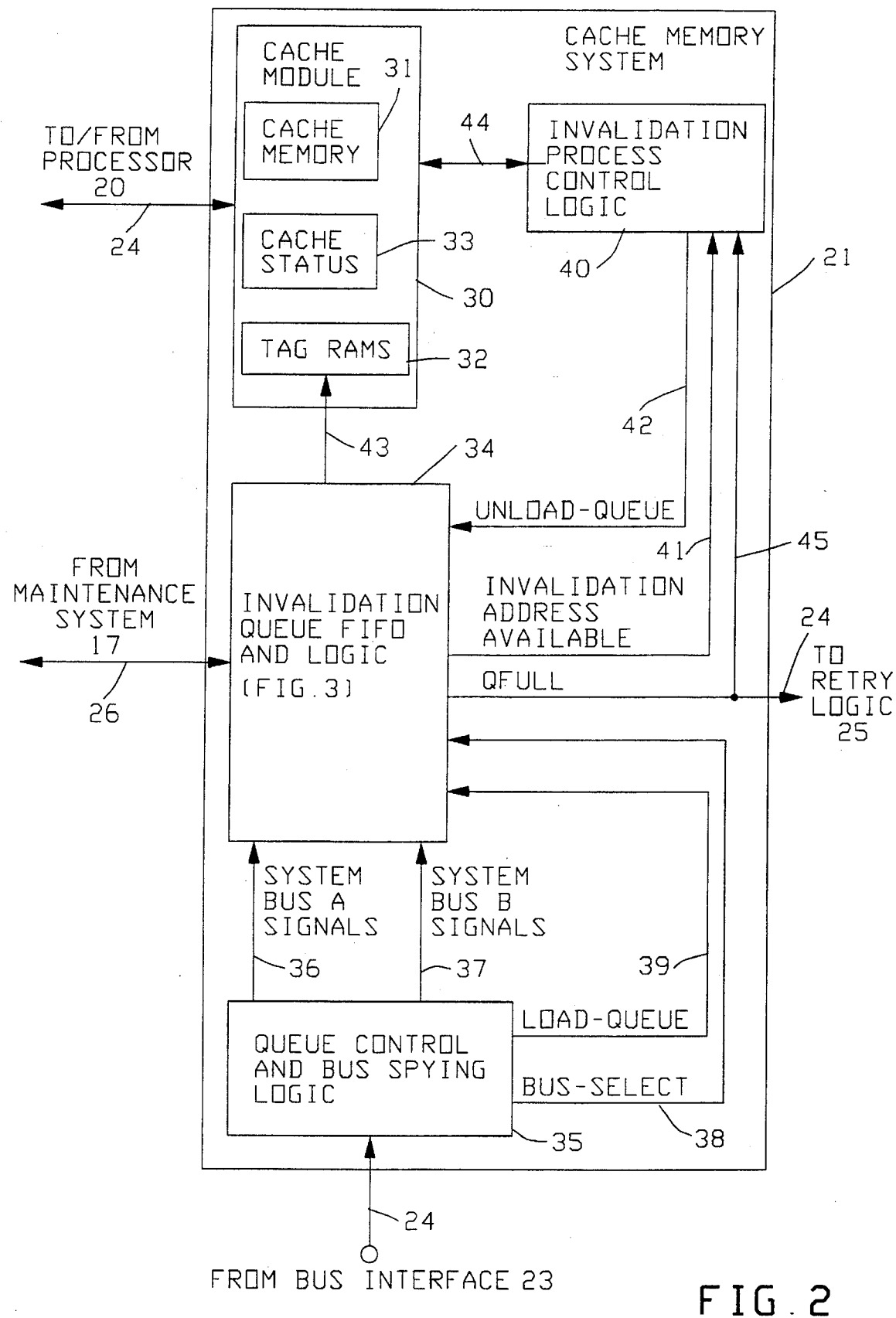
FIG. 2 is a schematic block diagram illustrating the cache system of FIG. 1 in which the present invention is utilized.

Referring to FIG. 2, in which like reference numerals indicate like components with respect to FIG. 1, details of the cache memory system 21 are illustrated. The cache memory system 21 includes a conventional cache module 30 comprising a cache data memory 31, cache tag RAMs 32, cache status indicators 33 and associated logic (not shown). The cache memory 31 holds the data from the main memory 12 cached therein by the processor 20. The cache tag RAMs 32 hold the address tag and validity data for the locations of the memory 31 in a well-known manner. When the processor 20 requires access to an addressable location, the tag RAMs 32 are consulted to determine if the address is resident in the memory 31. The cache status indicators 33 indicate the status of the tag RAMs 32 as either busy or available. The processor 20 utilizes the cache status indicators 33 to determine if the cache module 30 is available to it for program processing or is otherwise busy with an invalidation cycle. In a similar manner, the invalidation apparatus of the cache memory system 21 utilizes the cache status indicators 33 to determine if the cache module 30 is available for invalidation cycles or is busy with the processor 20.

The cache memory system 21 includes an invalidation queue First-In First-Out (FIFO) buffer 34 and associated logic. The invalidation queue 34 holds potential invalidation addresses spied from the system buses 14 for entry into the invalidation fields of the tag RAMs 32. The invalidation queue FIFO 34 includes adjustable upper and lower level limits for enhanced performance in accordance with the present invention. Details of the invalidation queue FIFO 34 and the associated logic will be later described with respect to FIG. 3.

The cache memory system 21 further includes queue control and bus spying logic 35. The queue control and bus spying logic 35 accesses the system buses 14 through the bus interface 23. The logic 35 decodes the bus commands to detect when WRITE operations are performed and loads the appropriate address signals for such commands into spy registers within the invalidation queue FIFO and logic 34. The system bus A address signals are applied via a path 36 and the system bus B address signals are applied via a path 37. The logic 35 provides a binary bus-select signal to the logic 34 via a line 38 indicating whether the invalidation address is from system bus A or system bus B. When an invalidation address is provided to the invalidation queue FIFO and logic 34, the queue control and bus spying logic 35 issues a Load-Queue signal via a line 39 as will be described in further detail with respect to FIG. 3.

The cache memory system 21 further includes invalidation process control logic 40 to control the operations required in invalidating addresses in the cache module 30. The invalidation queue FIFO and logic 34 issues an Invalidation Address Available signal to the invalidation process control logic 40 via a line 41 when the invalidation queue FIFO 34 is storing an invalidation address. The invalidation process control logic 40 issues an Unload-Queue signal to the invalidation queue FIFO and logic 34 via a line 42 to command the invalidation queue FIFO 34 to unload the invalidation address to the tag RAMs 32 via a bus 43. The invalidation process control logic 40 communicates with the cache status indicators 33 via a bus 44 to determine if the tag RAMs 32 are busy with activity from the processor 20 or are available to perform invalidations and controls invalidation cycles through the bus 44.

The invalidation queue FIFO and logic 34 issues a QFULL signal via a line 45 to the invalidation process control logic 40 when the invalidation queue FIFO 34 is logically full. The QFULL signal is also applied to the RETRY logic 25 via the bus 24. The invalidation queue FIFO and logic 34 also receives adjustable upper-limit and lower-limit signals from the maintenance system 17 via the bus 26 to define when the invalidation queue FIFO is logically full and logically flushed, respectively, in accordance with the present invention, in a manner to be described.

Figure 3:
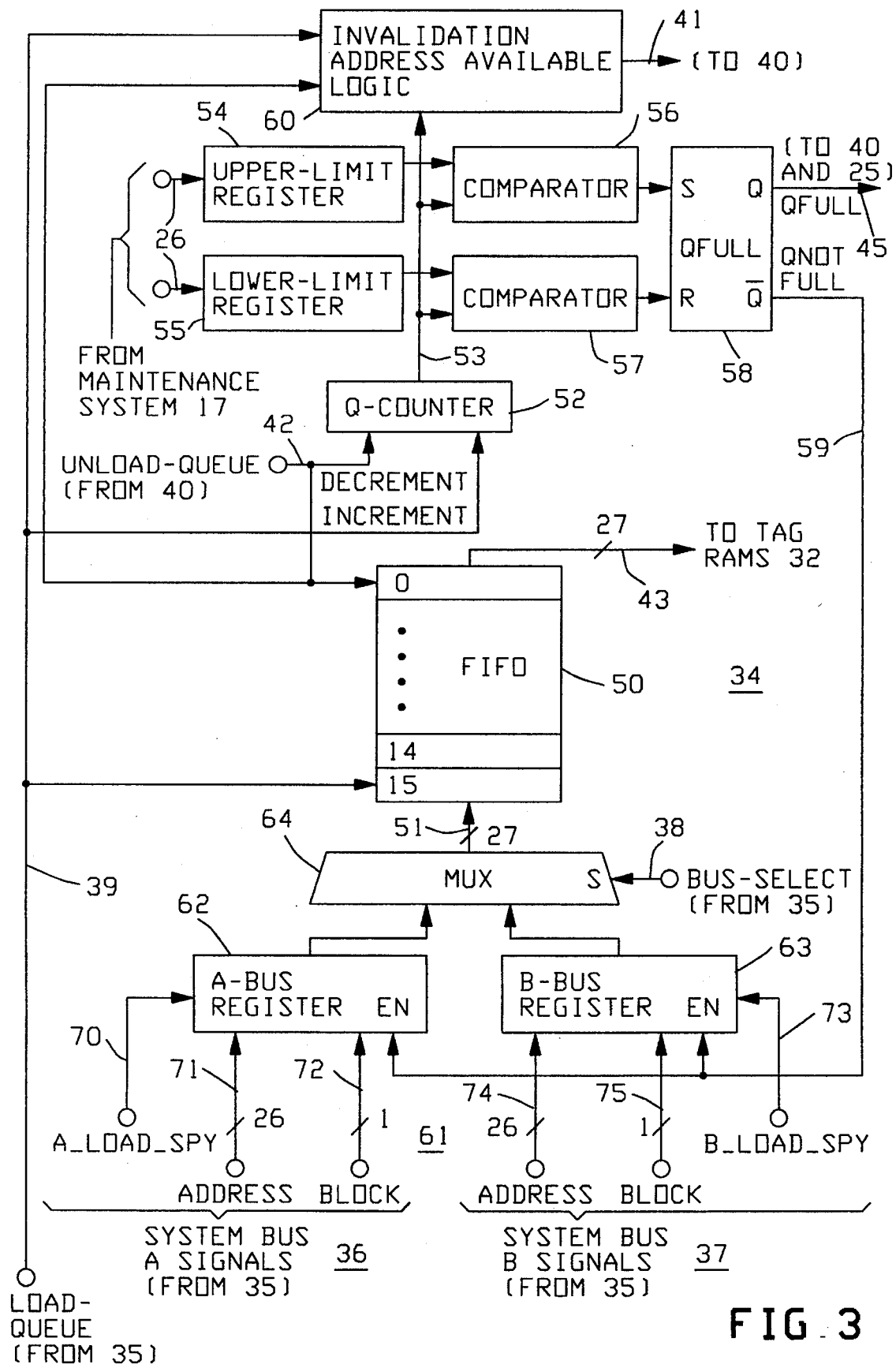
FIG. 3 is a schematic block diagram illustrating details of the invalidation queue structure of FIG. 2.

Referring to FIG. 3, in which like reference numerals indicate like components with respect to FIGS. 1 and 2, details of the invalidation queue FIFO and logic 34 are illustrated. The invalidation queue is implemented by a FIFO 50 which functions as a buffer between the system buses 14 and the cache memory module tag RAM resources 32. The invalidation queue mechanism is utilized since WRITE operations can occur on the system buses 14 more rapidly than the cache invalidation process can be executed. The queue FIFO 50 should be sufficiently wide to hold all of the pertinent information for each WRITE operation on the bus and adequately deep to hold sufficient WRITES to operate in accordance with the present invention, in a manner to be described. The depth of the FIFO 50 should be adequate to minimize the effect of invalidations on performance of the processor 20 and the computer system of FIG. 1 while assuring that no WRITES are lost. In the preferred embodiment of the invention, the FIFO 50 is 16 words deep to hold 16 invalidation addresses and 27 bits wide to hold a 26 bit address and 1 bit of block information.

An invalidation address is inserted into the FIFO 50 at word position 15 and an invalidation address is withdrawn from the FIFO at word position 0. Preferably, the FIFO 50 is implemented as a very fast unclocked, ripple structure with incoming data rippling the entire depth of the FIFO 50 in approximately 5 nanoseconds. This speed is realized utilizing current MOS technology. Each invalidation address is inserted into the FIFO 50 at word position 15 and then ripples up the FIFO 50 from position 15 to the highest available empty position. If the FIFO 50 is empty, an incoming invalidation address ripples up to word position 0 and is ready to be withdrawn from the queue.

A word is inserted into the FIFO 50 from a 27 bit bus 51 in response to the Load-Queue signal on the line 39 from the queue control and bus spying logic 35. A word is withdrawn from the FIFO 50 and applied to the 27 bit bus 43 in response to the Unload-Queue signal on the line 42 from the invalidation process control logic 40. Thus it is appreciated that the first word to enter the queue 50 is the first word withdrawn.

The invalidation queue FIFO and logic 34 further includes a Q-Counter 52 to track the number of invalidation addresses held in the FIFO 50 and to provide this number on counter output 53. The Q-Counter 52 receives a counter increment input from the Load-Queue signal on the line 39 and a counter decrement signal from the Unload-Queue signal on the line 42. Thus, each time address information is inserted into the queue FIFO 50, the Q-Counter is incremented by the Load-Queue signal and the Q-Counter 52 continues to indicate the current number of addresses held within the FIFO 50. Similarly, each time an invalidation address is withdrawn from the FIFO 50, the Unload-Queue signal decrements the Q-Counter 52 causing the counter to continue to hold the current number of addresses held in the FIFO 50.

In accordance with the invention, an upper-limit register 54 contains a QTRESH upper-limit threshold denoting when the FIFO 50 is logically full and a lower-limit register 55 contains a FLUSHLIM lower-limit threshold denoting when the FIFO 50 is logically flushed. In accordance with the invention, QTRESH and FLUSHLIM are adjustable and set from the maintenance system 17 via the bus 26 to optimize computer system performance.

The QTRESH and FLUSHLIM signals from the registers 54 and 55 are applied through comparators 56 and 57 to the set and reset inputs of a QFULL flip-flop 58, respectively. The comparators 56 and 57 also receive an input from the output 53 of the Q-Counter 52. The comparators 56 and 57 are configured such that the QFULL flip-flop 58 is set when the value in the Q-Counter 52 is greater than, or equal to the value in the upper-limit register 54 and is reset when the value in the Q-Counter 52 is less than, or equal to the value in the lower-limit register 55. The Q output of the flip-flop 58 provides the QFULL signal on the line 45 described above with respect to FIG. 2. The Q-NOT output of the flip-flop 58 provides a logical signal denoted as QNOTFULL on a line 59. In a manner to be described in greater detail below, when QFULL goes high, the FIFO 50 is flushed of invalidation addresses until QFULL goes low.

The invalidation queue FIFO and logic 34 further includes invalidation address available logic 60 that provides the Invalidation Address Available signal on the line 41 whenever an invalidation address resides in the FIFO 50 as discussed above with respect to FIG. 2. The logic 60 is responsive to the Load-Queue signal on the line 39, the Unload-Queue signal on the line 42 and the output 53 of the Q-Counter 52 for performing this function. Specifically, the Load-Queue signal on the line 39 sets a Queue Register Occupied Flip-flop (QROF) that generates the signal on the line 41. The flip-flop QROF is not shown. A combination of the Unload-Queue signal on the line 42 and the Q-Counter 52 going to zero resets QROF.

The invalidation queue FIFO and logic 34 includes internal spy logic 61 that provides interfaces to the system buses 14 through the external queue control and bus spying logic 35 (FIG. 2). The internal logic 61 includes an A-bus spy register 62, a B-bus spy register 63 and a multiplexer 64. The multiplexer 64 provides the invalidation address information to the FIFO 50 via the bus 51. The selection control input to the multiplexer 64 is provided by the bus-select signal on the line 38 from the queue control and bus spying logic 35. The inputs to the register 62 are provided by the system bus A signals on the path 36 and the inputs to the register 63 are provided by the system bus B signals on the path 37. The signals on the paths 36 and 37 are provided from the queue control and bus spying logic 35 as described above with respect to FIG. 2. The registers 62 and 63 function as system bus interfaces between system bus A and system bus B, respectively, and the FIFO 50 for the incoming system bus WRITE operation information.

The system bus A signals on the path 36 include an A-Load-Spy signal on a line 70, a 26 bit address field from the A-bus on a path 71 and a block bit on a line 72 indicating if the address field on the path 71 is for a single word WRITE or if it represents a multiple word block address. The A-Load-Spy signal on the line 70 loads the address and block information on the path 71 and line 72 into the register 62. In a similar manner, the system bus B signals on the path 37 are applied to the register 63 with respect to the system bus B WRITE operations. The path 37 is comprised of a line 73 for loading the register 63 in response to a B-Load-Spy signal, a 26 bit address path 74 and a line 75 for the block bit information.

Thus, the system address information is first held in the registers 62 and 63 and then multiplexed into the queue FIFO 50 via the multiplexer 64. The multiplexer select bit on the line 38 indicates whether the A or B bus is sourcing the address. The queue control and bus spying logic 35 (FIG. 2) selects which bus information is loaded into the FIFO 50 by controlling the multiplexer 64 via the bus-select signal on the line 38. If information from both system buses A and B arrive simultaneously, the A-Load-Spy signal on the line 70 and the B-Load-Spy signal on the line 73 concurrently load the bus information into the respective registers 62 and 63. Arbitration logic (not shown) in the queue control and bus spying logic 35 provides highest priority to the A-bus and services the B-bus on the next system clock period by appropriately controlling the bus-select signal on the line 38.

The enable inputs of the spy registers 62 and 63 receive the QNOTFULL signal from the flip-flop 58 on the line 59. In this manner the registers 62 and 63 are disabled during the flushing operation of the queue FIFO 50 when the QFULL signal on the line 45 is active. Thus, the spy registers 62 and 63 do not accept further invalidation addresses when QFULL is in effect.

Figure 4:
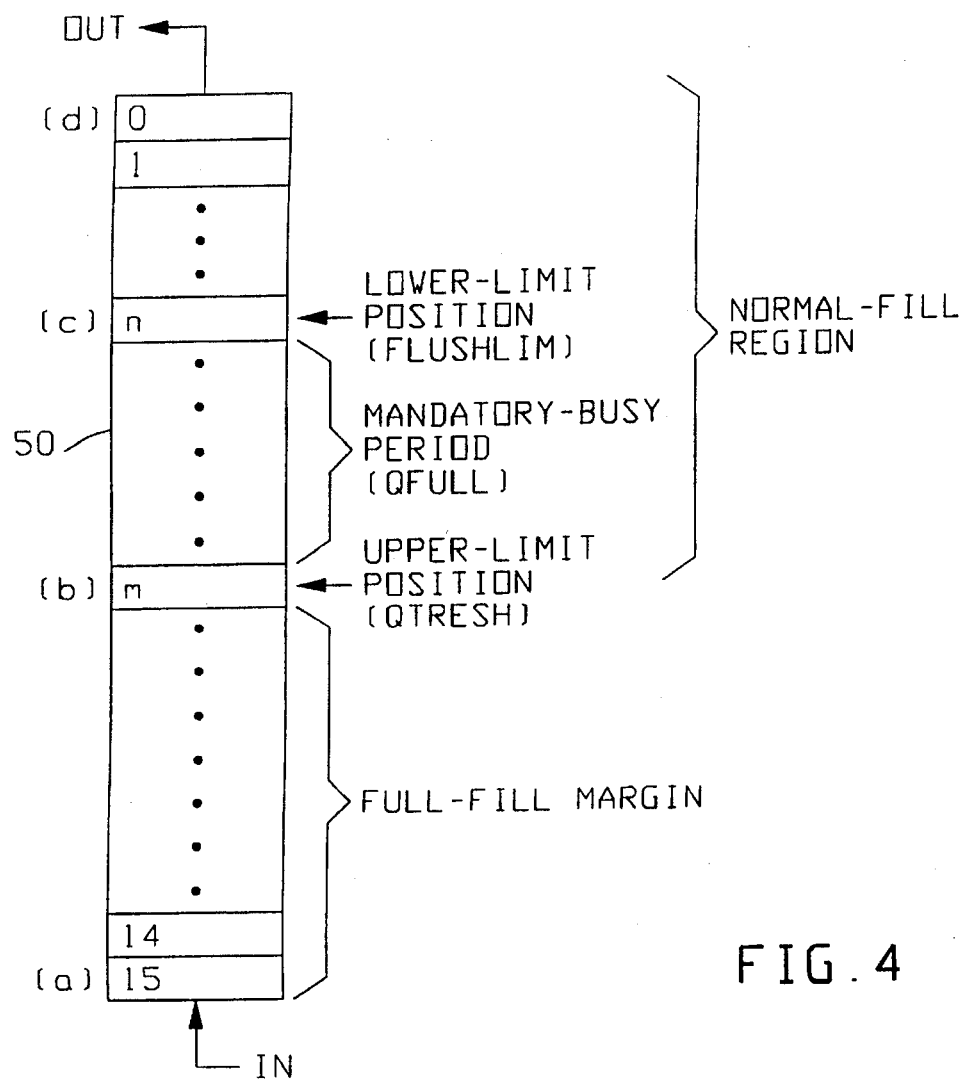
FIG. 4 is a schematic diagram of the queue structure of FIG. 3 illustrating queue adjustment parameters.

Referring to FIG. 4, the queue level parameters that are adjustable in accordance with the present invention are graphically depicted. The "Upper-Limit Position" (b) is the level of the FIFO 50 where the QFULL condition occurs. The "Lower-Limit Position" (c) is the level of the FIFO 50 where the QNOTFULL condition occurs. The (b) level is denoted as QTRESH and the (c) level is denoted as FLUSHLIM. When the Upper-Limit Position (b) is reached, the FIFO 50 is considered logically full and a mandatory flush operation is initiated to flush the queue. The FIFO 50 is flushed until the Lower-Limit Position (c) is attained. This period (b–c) is denoted as the "Mandatory-Busy Period" during which the cache must execute mandatory invalidation processes. During the Mandatory-Busy Period, the cache module 30 is "busy" to the processor 20, as denoted by the cache status indicators 33 (FIG. 2).

The "Normal-Fill Region" (d–b) is the region of the FIFO 50 where the queue can fill and unfill under "normal"

conditions. The queue is not considered full in this region. Thus, in the Normal-Fill Region, the processor 20 and the invalidation process can alternate in accessing the cache tag RAM resources 32.

A "Full-Fill Margin" (a–b) provides a significant safety margin region and encompasses the total number of additional incoming WRITE operations that can occur on the system buses without the loss of data coherency. The Full-Fill Margin is the space in the FIFO 50 above the position where QFULL occurs. The Full-Fill Margin is defined in accordance with the operational conditions of the computer system in which the invalidation queue mechanism of the present invention is utilized in a manner to be further explained.

In operation of the computer system of FIG. 1, with continued reference to FIGS. 1–4, when the central processor unit 10 operates in the Normal-Fill Region, the processor 20 and the invalidation process control logic 40 alternate in accessing the cache module 30. The processor 20 utilizes the cache module 30 to perform data processing cycles and the invalidation process control logic 40 utilizes the cache module 30 to execute invalidation cycles. The processor 20 consults the cache status indicators 33 to determine if the cache module 30 is busy with the invalidation progress control logic 40 when the processor 20 desires to perform a data cycle. Conversely, the invalidation process control logic 40 consults the cache status indicators 33 to determine if the cache module 30 is busy with the processor 20 when the invalidation process control logic 40 has an invalidation cycle to perform.

In response to the Invalidation Address Available signal on the line 41, the invalidation process control logic 40 performs an invalidation cycle by issuing the Unload-Queue signal on line 42 to withdraw the invalidation address from position 0 of the FIFO 50. The invalidation address is transmitted to the tag RAMs 32 on the bus 43 to determine if the address is resident in the cache memory 31. If so, the invalidation process control logic 40 marks the address invalid in the tag RAMs 32.

Thus, the invalidation process control logic 40 will withdraw an invalidation address from the queue whenever one is in position 0 of the FIFO 50 and the cache tag RAM resources 32 are available. As discussed above, when an invalidation address is withdrawn from the FIFO 50, the Q-Counter 52 is decremented. The described operations occur with respect to the Normal-Fill Region of FIG. 4 with the QNOTFULL signal on the line 59 from the QFULL flip-flop 58 high. With QNOTFULL high, the spy registers 62 and 63 are enabled.

The queue control and bus spying logic 35 monitors the system A and B buses 14 for WRITE operations and transmits the associated potential invalidation addresses along path 36 or 37 to the spy registers 62 or 63, respectively, in accordance with which bus sourced the data. The queue control and bus spying logic 35 issues the appropriate A-Load-Spy or B-Load-Spy signal on the line 70 or 73 to load the spy register 62 or 63, respectively. The multiplexer 64 is controlled by the bus-select signal on the line 38 to transmit the potential invalidation addresses to the FIFO 50 on the bus 51. The potential invalidation addresses are loaded into position 15 of the FIFO 50 by the Load-Queue signal on the line 39 from the queue control and bus spying logic 35.

As previously described, the addresses ripple through the FIFO 50 to the highest available position for ultimate withdrawal from position 0. The invalidation queue is implemented utilizing the FIFO 50 so that from the addresses stored in the queue, the first address received will be the first address withdrawn for an invalidation cycle. The FIFO queue level indicator QTRESH marks how high the queue will be allowed to be filled before the QFULL condition occurs. The FLUSHLIM queue level indicator marks how low the FIFO queue will be shifted out before new invalidations are accepted by the spy registers 62 and 63. Both limit registers 54 and 55 holding QTRESH and FLUSHLIM, respectively, are set during maintenance initialization.

When the queue FIFO 50 fills to position (b) of FIG. 4, the invalidation process control logic 40 performs a mandatory invalidation process denoted as the Mandatory-Busy Period of FIG. 4. The mandatory invalidation process is performed when the Q-Counter 52 attains the QTRESH value held in the upper-limit register 54. When this occurs, the QFULL flip-flop 58 is set and the invalidation queue 50 is logically "FULL" with unloading of the addresses and the invalidation processes being mandatory.

When the invalidation queue 50 is full, the cache module 30 will go "busy" to the processor 20 as reflected by the cache status indicators 33, thus rendering the cache tag RAM resources 32 available to the invalidation process on a full time basis. Accordingly, in response to QFULL, the invalidation process control logic 40 controls the mandatory invalidation process via the Unload-Queue signal on the line 42 and cache control signals on the bus 44. The invalidation addresses are withdrawn from the queue FIFO 50 to the tag RAMs 32 and the invalidation processes occur at maximum speed. With each address withdrawal, the Q-Counter 52 is decremented. In the mandatory invalidation process, QNOT-FULL is low thereby disabling the spy registers 62 and 63 so that during mandatory invalidation no new invalidation addresses are accepted. Additionally, QFULL is applied to the RETRY logic 25 (FIG. 1) to retry WRITE requests on the system buses. The mandatory invalidation process is denoted as queue flushing.

The queue flushing operation continues until the Q-Counter 52 attains the FLUSHLIM value stored in the lower-limit register 55. When this occurs, the queue FIFO 50 is logically NOT-FULL (logically empty) and the invalidation process control logic 40 controls the system to revert to the Normal-Fill Region operation described above with respect to FIG. 4. When this logical NOT-FULL condition is attained, the mandatory invalidation process is no longer in effect, the cache module 30 is no longer busy to the processor 20, and normal invalidations recommence as described above. When the Q-Counter 52 equals FLUSH-LIM, the QFULL flip-flop 58 is reset enabling the spy registers 62 and 63 to once again accept invalidation addresses. Additionally, RETRY is no longer in effect.

In accordance with the invention, the queue structure 34 utilizes variable limits QTRESH and FLUSHLIM for the full and non-full indicators, respectively, of the FIFO 50. By this mechanism, the system can be fine-tuned at initialization and debug time as to the queue level at which the mandatory-busy, queue flushing period will begin and also the queue level at which the mandatory invalidation condition will revert to the normal-fill, normal invalidation region. The fine tuning is achieved by empirically determining optimum values for QTRESH and FLUSHLIM and storing these values in the registers 54 and 55, respectively. The values are determined by operating under maximum system conditions and evaluating system performance with various limit values. Preferably, the optimum values are loaded into the limit registers 54 and 55 at system initialization time.

The values QTRESH and FLUSHLIM are set to optimize system performance. Specifically, the limits should be chosen to maximize the Normal-Fill Region while maintaining a sufficient Full-Fill Margin so as to prevent losing invalidation WRITES thereby maintaining data coherency. The limit values are also chosen to minimize RETRYing WRITE requests on the system buses. Operation in the Mandatory-Busy Period should be minimized to permit the processor 20 maximum access to the cache module 30 so as to maximize processor performance at the same time minimizing RETRYs which cause undesirable system bus traffic. Excessive RETRYing drastically slows down the operation of the system buses.

Although not discussed above nor shown in the Figures, it is appreciated that the bus interface of the I/O system 13 (FIG. 1) includes a RETRY counter. The RETRY counter times the RETRY wait interval for bus WRITE requests when activated by a RETRY signal on the system buses issued, for example, from the RETRY logic 25. The values of QTRESH and FLUSHLIM should also be set so that the duration of the queue flushing operation coincides with a small number of RETRY wait intervals. The values of QTRESH and FLUSHLIM should be coordinated with the RETRY counter in the I/O system 13 which permits the I/O module to access the system buses after it has been RETRYed. If the gap between QTRESH and FLUSHLIM is large, but the RETRY counter value in the I/O system is low, the I/O system will be RETRYed frequently when the FIFO queue 50 is full. This results in unnecessary system bus traffic. Preferably, QTRESH and FLUSHLIM should be set to permit enough time for the QFULL flip-flop 58 to reset before allowing the I/O system 13 to access the system buses 14 after RETRY.

It is appreciated that there are literally hundreds of combinations of values that would provide varying degrees of performance in accordance with the configuration of the system. For example, in the above-described system utilizing the two spy registers 62 and 63 with bus write RETRYs implemented while the QFULL flip-flop 58 is set, a Full-Fill Margin of two would be adequate to maintain data coherency providing system data integrity. Room is provided in the queue for invalidation addresses that may be in the spy registers 62 and 63 when QFULL goes on. This consideration also enhances system performance by providing empty spy registers for immediate receipt of potential invalidation addresses from the system buses when the QFULL flip-flop 58 is reset. Although it is desirable to provide a large Normal-Fill Region, the Full-Fill Margin should remain sufficient to empty the spy registers when QFULL is enabled.

As discussed above, the spy registers 62 and 63 are disabled for receipt of invalidation addresses during the QFULL period. In architectures where the spy registers are not disabled and the bus WRITE requests are not RETRYed, a larger Full-Fill Margin would be required with concomitant adjustments to QTRESH and FLUSHLIM. Appropriate limits would be dynamically established to maximize processor performance under maximum system dynamic conditions.

In the system described above, an upper-limit of 8 and a lower-limit of 4 was established. These empirically derived limits resulted in system performance whereby over 90% of the time the queue FIFO 50 had only one or no invalidations pending in the queue under worst case data traffic conditions. Additionally, the processor 20 could access the cache resources over 90% of the time without the cache module 30 being busy because of invalidation processing. Furthermore, incoming invalidation addresses from the system buses were loaded into the queue without forcing system bus RETRYs of system WRITES over 90% of the time. With these limits, invalidations were performed in time slots between processor-to-cache accesses for over 90% of the computer system operating time.

In the above-described embodiment utilizing the two spy registers 62 and 63 and a queue FIFO 50 with a depth of 16 addresses, a QTRESH value of 13 with an appropriate FLUSHLIM value would also provide good performance. FLUSHLIM may be set at 11 or 12 so as to as quickly as possible return to normal operation.

The Full-Fill Margin is the safety margin accommodating the number of additional incoming WRITE operations that can occur on the system buses without the loss of data coherency or drastically slowing down the system buses by excessive RETRYing. If, for example, the upper-limit were set to the maximum size of the FIFO 50, then when the mandatory unloading condition occurs, the queue would have a Full-Fill Margin of zero. There would be no room in the queue to accept additional incoming bus WRITES. If a new bus WRITE occurs before the first address can be withdrawn from the queue, a data coherency problem can occur resulting in questionable system integrity. On the other hand, if the upper-limit value is set too low, thereby providing a large Full-Fill Margin, then the invalidation queue 34 would enter the QFULL, Mandatory-Busy Period too often. Also, if the lower-limit value is set too far below the upper-limit value, the Mandatory-Busy Period would be of too long a duration. Since in the Mandatory-Busy Period no processor work is performed and the bus WRITES are continually RETRYed, these conditions could have significant performance effects.

The objective of fine-tuning the upper and lower invalidation queue limits is to create an adequately large Normal-Fill Region while providing sufficient Full-Fill Margin for safety. Additionally, the limit values are chosen to provide an appropriate queue flushing interval. The fine-tuning objective permits achieving the tag RAM operations of the processor retrieving hit data from the cache while system invalidations are performed without degrading system through-put and data integrity.

Preferably, the invalidation queue of the present invention is implemented in ASIC VLSI gate array hardware resulting in a large and yet relatively inexpensive queue to be utilized within the cache system. Normally, this gate array technology does not permit system hardware to be altered after initial design without significant schedule delay. By use of the adjustable queue system, as described above, fine-tuning after hardware design can be achieved to provide an optimum combination of performance and data integrity. The present invention provides for fine-tuning of queue size and operating characteristics after the gate array has been built and installed within the system. The invalidation queue has "soft" characteristics permitting adjustment in the queue upper and lower limits which specify when the queue is considered full and flushed, respectively. Utilization of the present invention facilitates the efficient processing of invalidation information at the least cost in performance to the computer system. The invention permits maximizing system memory bandpass for high speed data Input/Output traffic. Although the I/O traffic causes invalidations, the processor is not impeded thereby. Both the processor and the I/O subsystem can perform more work.

The present invention is explained above in terms of a storage queue with adjustable level limits. It is appreciated that the Full-Fill Margin of the present invention would also be useful for the reasons given above even with a fixed upper-limit position.

Although the invention is advantageously utilized as the invalidation queue for a cache memory system, the invention may also be advantageously utilized in other applications. For example, in a communication environment where packets of data are temporarily stored before transmission to a potentially busy receiving device, the logical size of the temporary storage and the level of flushing the store before accepting more data can be adjusted in accordance with dynamically varying conditions. In addition, the Full-Fill Margin can be utilized so as not to lose data.

The operation of the storage queue of the present invention was explained in terms of flushing the queue when the contents thereof attained the Upper-Limit Position and discontinuing the flushing operation when the contents attained the Lower-Limit Position. The queue might also be utilized in a mode whereby the queue is rapidly filled rather than flushed as controlled by the Upper-Limit and Lower-Limit Positions. In this mode, normal operation would be defined as (c)–(a), as illustrated in FIG. 4. When the contents of the queue attain the Lower-Limit Position, the queue is rapidly filled until the contents attain the Upper-Limit Position. Thereafter, the system is operated in a "normal" data transport mode.

Figure 5:
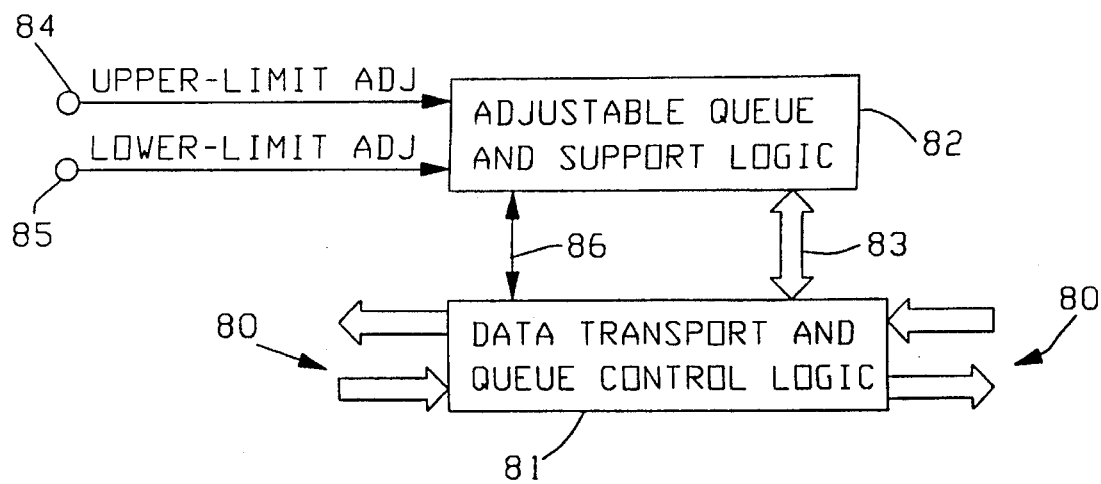
FIG. 5 is a schematic block diagram illustrating utilizing the adjustable queue of the present invention in a bi-directional data communication system.

Referring to FIG. 5, a bi-directional data communication system utilizing the adjustable queue of the present invention is schematically illustrated. Data is transported in full duplex fashion along a data communication medium 80. The data passes through data transport and queue control logic 81 wherefrom the data may be diverted through adjustable queue and support logic 82 through full duplex bus 83. The adjustable queue and support logic 82 is configured in a manner similar to that described above with respect to FIGS. 3 and 4. The Upper-Limit Position adjustment is provided from an input 84 and the Lower-Limit Position adjustment is provided from an input 85. Data entering the data transport and queue control logic 81 from the medium 80 is buffered in the adjustable queue 82 before being returned to the medium 80 by the logic 81.

The Upper and Lower Limit Positions of the queue 82 are adjusted in the manner described above in accordance with the data transportation statistics and dynamics of the illustrated system. The queue 82 may be operated in either a rapid flushing or rapid filling mode, as described above, in accordance with system requirements. The data transport and queue control logic 81 controls the adjustable queue 82 via a path 86 in a manner similar to the embodiment of the invention described with respect to FIGS. 3 and 4.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. In a computer system having first and second memory systems, said second memory system being a cache memory system for storing data resident in said first memory system, addressable locations of said first memory system being overwritten in operation of said computer system thereby creating overwritten addressable locations, said cache memory system comprising spy means for monitoring when addressable locations of said first memory system are overwritten and for providing address signals representative of said overwritten addressable locations, queue means responsive to said address signals for storing said address signals, thereby providing queued address signals, said queue means holding a number of said queued address signals, invalidation means for withdrawing queued address signals from said queue means and marking locations of said cache memory system invalid in accordance therewith, said invalidation means being controllably operative to perform a queue flushing operation by continuously withdrawing queued address signals from said queue means and marking locations of said cache memory system invalid in accordance therewith, upper limit determining means responsive to said number of said queued address signals for providing an upper limit signal when said number of said queued address signals reaches an adjustable upper limit, lower limit determining means responsive to said number of said queued address signals for providing a lower limit signal when said number of said queued address signals reaches an adjustable lower limit, said invalidation means being responsive to said upper and lower limit signals and operative to perform said queue flushing operation in response to said upper limit signal and to discontinue said queue flushing operation in response to said lower limit signal, and setting means for setting said adjustable upper and lower limits, said queue means having a maximum capacity, said setting means being operative to set said adjustable upper limit at less than said maximum capacity so as to create a full-fill margin between said adjustable upper limit and said maximum capacity for accepting and storing address signals from said spy means when said queue flushing operation is being performed.

2. The cache memory system of claim 1 wherein said queue means comprises a FIFO.

3. The cache memory system of claim 1 further including a counter for providing a count signal representative of said number of said queued address signals, said counter being responsive to said spy means for incrementing said count signal when an address signal is entered into said queue means, said counter being responsive to said invalidation means for decrementing said count signal when a queued address signal is withdrawn from said queue means.

4. The cache memory system of claim 3 wherein said upper limit determining means includes comparator means responsive to said adjustable upper limit and said count signal for providing said upper limit signal when said count signal reaches said adjustable upper limit.

5. The cache memory system of claim 3 wherein said lower limit determining means includes comparator means responsive to said adjustable lower limit and said count signal for providing said lower limit signal when said count signal reaches said adjustable lower limit.

6. The cache memory system of claim 1 wherein said first memory system comprises a main memory of said computer system, said computer system comprising a processor, said cache memory system being included in said processor, an I/O system, and bus means intercoupling said processor, said main memory and said I/O system.

7. The cache memory system of claim 6 wherein WRITE operations to said main memory are effected by issuing WRITE requests on said bus means, said processor further including RETRY means responsive to said upper and lower limit signals for issuing a RETRY signal to said bus means to cause RETRYing of said WRITE requests while said queue flushing operation is being performed.

8. The cache memory system of claim 6 wherein said setting means is operative for setting said adjustable upper and lower limits so as to minimize said issuing said RETRY signal to said bus means to enhance performance of said computer system.

9. The cache memory system of claim 8 wherein said setting means is operative for setting said adjustable upper and lower limits to 8 queued address signals and 4 queued address signals, respectively.

10. The cache memory system of claim 8 wherein said spy means comprises means for monitoring said bus means to detect said address signals representative of said overwritten addressable locations and to accept said address signals for transmission to said queue means for storage therein, said spy means being further operative in response to said upper and lower limit signals to disable acceptance of said address signals from said bus means while said queue flushing operation is being performed.

* * * * *